United States Patent Office 3,297,330
Patented Jan. 10, 1967

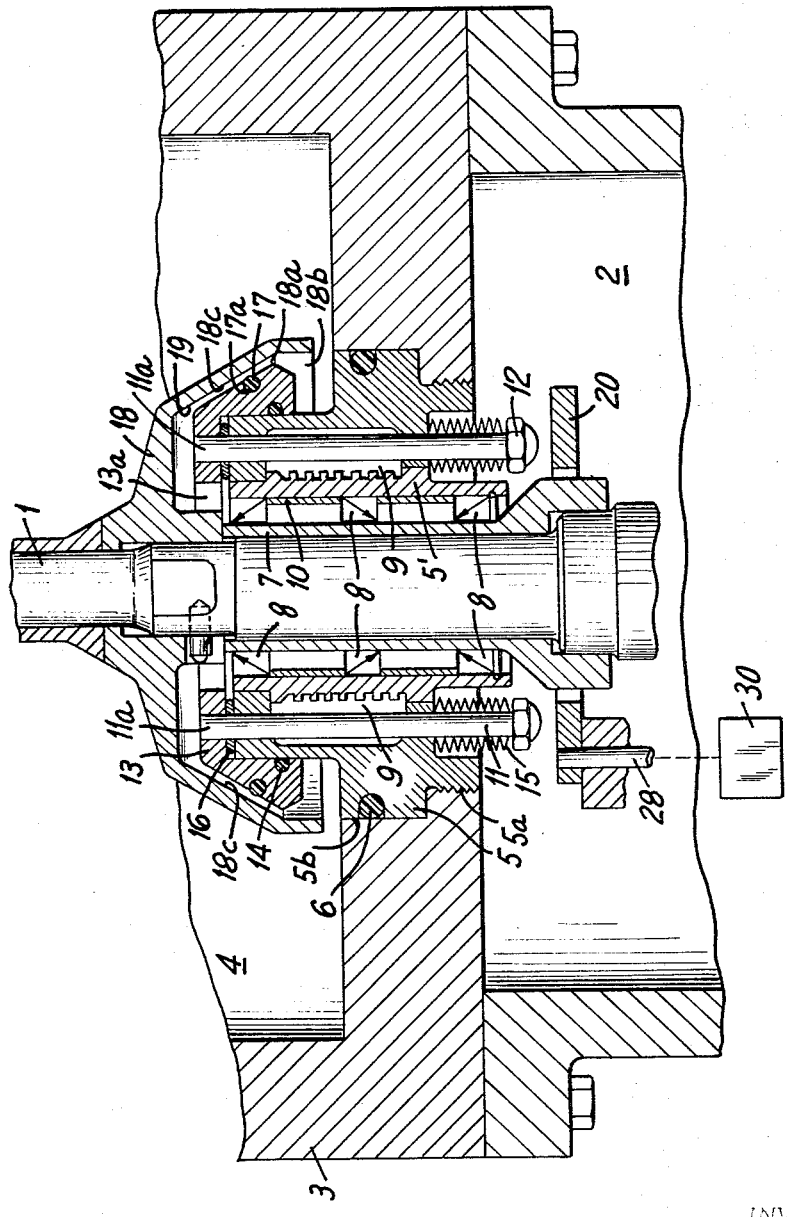

3,297,330
MECHANICAL SEAL BETWEEN SHAFT AND VESSEL
Oskar Krieger, 25 Frohburgstrasse, Muttenz, Base-Land, Switzerland
Filed Mar. 23, 1964, Ser. No. 353,726
Claims priority, application Switzerland, Mar. 21, 1963, 3,569/63
7 Claims. (Cl. 277—12)

The present invention has reference to an improved sealing device for a shaft projecting into a container or vessel with a sealed shaft entrance or throughpassage arranged in a cylindrical extension or sleeve of the container floor and with a downwardly directed bell-shaped top or socket encircling the shaft entrance in which there is arranged a gas cushion, and further wherein the aforesaid bell-shaped top or socket is seated in sealing relation and rigidly mounted for rotation upon the shaft.

Sealing devices of the aforementioned type are employed for example in conjunction with mixing or stirrer vessels for sealing the normal or high speed rotating shaft carrying the stirrer element. In German Patent 819,027, granted Oct. 29, 1951, there is disclosed such type of sealing device. In this known arrangement the shaft is introduced into the vessel or container in the absence of a stuffing box and is surrounded by a double-walled, cylindrical extension or sleeve of the container floor which is open at its upper end. The bell-shaped socket seated upon the shaft is constructed as a double-wall cylinder, the inner wall of which projects or protrudes with respect to the outer wall thereof. The outer wall surrounds the extension or sleeve and the inner wall projects into an annular compartment of this sleeve and extends up to the region of the floor of the annular compartment. The shaft entrance is sealed by means of a liquid seal located within the annular compartment, and a gas cushion is provided between the sealing liquid and the material to be mixed.

However, with a stirring or mixing vessel exhibiting such type sealing arrangement the charged material cannot be forced out by means of overpressure (compressed air or other gases). Also, such a sealing arrangement cannot be used in a mixing vessel which must be tilted in order to be emptied.

In order to prevent the loss of sealing liquid during tilting, rolling etc. an annular chamber is provided in the neighborhood of the floor of the annular compartment which communicates with the annular chamber through the agency of a circular slot located at the lowermost location of the annular chamber. This annular chamber, however, only fulfills its purpose if the vessel is tilted slowly. Additionally, it is also not possible to perform the mixing operation in a vacuum in a mixing vessel provided with such a sealing arrangement.

It is, therefore, an important object of the present invention to provide a sealing device of the heretofore mentioned type which, among other things, permits emptying of the vessel by means of an overpressure or pressure in excess of atmospheric pressure and by tilting of the vessel.

Another important object of this invention is to provide an improved sealing arrangement for a shaft member extending through a shaft opening which is of relatively simplified construction, does not require a great deal of servicing or supervision, yet is highly reliable in providing an effective seal at such shaft opening.

In order to implement these and other objects of the invention such is characterized by the features that an annular body member sealingly encircles an extension or sleeve and is displaceably guided therealong, and further, is delivered in sealing relation towards the inner wall of a bell-shaped top or socket. By virtue of this arrangement it is possible, by adjusting the annular body member towards the bell-shaped top, to separate the sealing shaft entrance as well as the gas cushion from the material to be mixed, so that such can be forced out of the vessel by means of overpressure, or can flow out of the vessel by tilting thereof, without influencing the shaft seal.

In accordance with a preferred manifestation of the invention the annular body member can be advanced or delivered by means of push rods or plungers engaging therewith and piercingly extending through the vessel floor, with the plungers extending through recesses or openings provided at the sleeve or extension, such recesses being sealable by sealing rings arranged in each case at the push rods and capable of being pressed by the annular body member against the frontal face of the aforesaid sleeve or extension.

This embodiment of the present invention exhibits the advantage that the mixing operation can also take place in a mixing vessel which is subjected to a vacuum. In order to prevent that the material to be mixed reaches the shaft throughpassage or entrance, in this instance there must after the mixing operation be first of all provided atmospheric pressure beneath the bell-shaped top or socket and first then atmospheric pressure within the vessel.

Other features, objects and advantages of the invention will become apparent by reference to the following detailed description and drawing in which there is schematically illustrated in vertical cross-section an embodiment of the sealing device of the present invention provided for a mixing apparatus.

Describing now the single figure, it will be seen that a rotatable shaft 1 extends from a lower compartment 2 in which such shaft is operably coupled with a non-illustrated drive through a container or vessel floor 3, being conducted into the internal mixing compartment 4 of the vessel proper. The shaft 1 carries for example at its upper end a suitable mixing or stirring element (not shown) by means of which it is possible to agitate or mix the material located within the compartment 4. A packing sleeve 5 providing a cylindrical sleeve or extension is threaded, at 5a, into a bore 5b of the vessel floor 3 and is sealed through the agency of an O-ring 6. In a sleeve-shaped insert or bushing 5' of the packing sleeve 5 there are arranged sealing rings, for instance simmer gaskets or retaining rings 8, which sealably enclose a bushing or sleeve 7 arranged in sealing relation and fixed for rotation at the shaft 1. These retaining rings 8 are held in spaced relation with regard to one another by means of bearing spacers or spacer sleeves 10.

Two diametrically opposed push rods or plungers 11 provided at their respective lower end with stop means 12 extend from below through recesses 9 of the packing sleeve 5 towards the top. A truncated cone-shaped annular body member 13 provided with a circular recess 13a is operably connected with the upper end 11a of the respective push rods 11 extending out of the packing sleeve 5. This annular body member 13 encloses the packing sleeve 5 in sealing fashion and is displaceably guided therealong. An O-ring 16 is in each case loosely arranged about a respective push rod 11 and adheres to the latter as well as being located between the annular body member 13 and the packing sleeve 5.

A cup or disc spring assembly 15 arranged in each instance between the respective push rod stop 12 and the packing sleeve 5 pulls the annular body member 13 towards the packing sleeve 5 and holds such in its lowermost position, whereby in this position the O-rings 16 are pressed against the packing sleeve 5 by the annular body member 13. A further O-ring 17, the function of which will be more fully explained hereinafter, is inserted in an externally arranged peripheral groove 17a. Above the annular body member 13 and at a spacing with respect thereto there is disposed a bell-shaped top or socket 18 arranged in sealing relation upon the shaft 1 and rigidly connected for rotation thereto. This bell-shaped top or socket 18 possesses a corresponding truncated cone-shaped compartment or clearance 19 and extends up to the zone of the vessel floor 3.

A thrust collar 20 is arranged in the compartment 2 at a spacing beneath the push rod stops 12, such thrust collar being operably connected by a control rod 28 with a suitable hand-actuated delivery or advancing mechanism, generally designated by reference numeral 30, by means of which the annular body member 13 with the O-ring 17 can be advanced through the agency of the thrust collar 20 and the push rods 11 against the action of the disc springs or spring washers 15 towards the inner wall 18c of the bell-shaped top or socket 18.

The mode of operation of the aforedescribed sealing arrangement or device is as follows: The material to be mixed or agitated is introduced into the compartment 4. This material only partially fills the clearance or compartment 18a beneath the bell-shaped top or socket 18 because the air entrained beneath such bell-shaped top is compressed. The size of the bell-shaped top, in other words the air volume enclosed beneath the aforesaid bell-shaped top, is selected with regard to the capacity of the vessel such that the material penetrating beneath the bell-shaped top can never reach the upper end of the packing sleeve 5. During the mixing or stirring operation the air or gas cushion remains completely beneath the bell-shaped top or socket 18, that is the material cannot come into contact with the seal. If the compartment 4, that is the mixing vessel, is subjected to a vacuum then the level of the material beneath the bell-shaped top or socket 18 drops until reaching the lower edge 18b of the aforesaid bell-shaped top, whereby some air can escape from the compartment beneath the bell-shaped top depending upon the magnitude of the vacuum. The air cushion beneath the bell-shaped top 18 is nonetheless now maintained as before. If the atmospheric pressure is again generated after the working operation within the compartment 4 for the purpose of emptying, then first the annular body member 13 is delivered in sealing relation against the bell-shaped top 18 with a preceding shutdown of the mixer-drive, whereby in the clearance or chamber 18a beneath the aforesaid top air can be sucked through the recesses 9 and 13a along the push rods 11. As a result, the normal atmospheric pressure appears in the chamber of the bell-shaped top between the retaining rings 8 and the O-ring seal 17.

After releasing the annular body member 13 from engagement with the bell-shaped top 18 there forcibly appears the material level beneath the bell-shaped top 18 originally present during the filling of the vessel. During emptying of the vessel by tilting, the annular body member 13 remains closed however.

If the charged material is forced out by means of overpressure (compressed air or other gases) the annular body member 13 likewise remains closed, that is, in engagement with the bell-shaped top 18. If the charged material is removed from the vessel by means of an emptying tap or valve the annular body member 13 can again be released via the push rods by means of the delivery or advancing mechanism being displaced away from such push rods, so that under the action of the disc springs 15 the annular body member 13 is moved towards the packing sleeve 5, that is the sealing device or arrangement is again placed into its working condition or position. It is to be appreciated that the term "gas cushion" as employed herein is used in its broader sense to also encompass an air cushion.

While there is shown and described a present preferred embodiment of the invention it is to be distinctly understood that the invention is not limited thereto but may be otherwise variously embodied and practiced within the scope of the following claims.

What is claimed is:

1. In combination, a vessel provided at its floor with a shaft entrance, a cylindrical extension provided at the floor of said vessel in the region of said shaft entrance, a shaft extending through said shaft entrance into the interior of the vessel, a sealing device for said shaft arranged at said shaft entrance, said sealing device comprising means for sealing said shaft entrance, a hollow, downwardly directed, bell-shaped socket member mounted in sealing relation upon said shaft and fixed for rotation thereto, said bell-shaped socket member being disposed within said vessel and spaced from and encircling said cylindrical extension, an annular body member located within said bell-shaped socket member and spaced therefrom to form a clearance between the inner wall of said bell-shaped socket member and the outer surface of said annular body member said clearance communicating with the interior of said vessel, and said annular body member surrounding said cylindrical extension in sealing fashion, and means for mounting said annular body member for displacement along said cylindrical extension to enable said annular body member to be advanced in sealing relation against the inner wall of said bell-shaped socket member over an annular portion thereof spaced from said shaft for providing a gas path between the exterior of said vessel and said clearance and for sealing off said clearance from the interior of said vessel, and a gas cushion located within said clearance.

2. The combination according to claim 1, including a sealing ring in said annular body member for sealingly engaging the inner wall of said bell-shaped socket member when the annular body member is advanced.

3. The combination according to claim 1 wherein said means includes plunger means extending through said extension and engaging with said annular body member for advancing the latter.

4. The combination according to claim 3 wherein said cylindrical extension is provided with recesses through which extend said plunger means, sealing ring means surrounding said plunger means and displaceable by said annular body member in sealing relation against a frontal face of said cylindrical extension.

5. The combination according to claim 4 including spring means for urging said annular body member in a direction placing said sealing ring means in sealing relation against the frontal face of said cylindrical extension.

6. The combination according to claim 3 including spring means acting upon said plunger means for urging said annular body member in a first direction towards said floor, and means for advancing said annular body member against the action of said spring means.

7. The combination according to claim 6 wherein said advancing means is disposed beneath said plunger means for cooperation with the latter in order to advance said annular body member against said bell-shaped socket member.

References Cited by the Examiner

UNITED STATES PATENTS 2,901,294 8/1959 Smith _____ 308—36.1
3,198,530 8/1965 Conklin _____ 277—41

SAMUEL ROTHBERG, *Primary Examiner.*